United States Patent [19]

Matsumoto

[11] 4,352,624

[45] Oct. 5, 1982

[54] REFUSE COMPACTION TRAILER

[75] Inventor: Tom T. Matsumoto, 889 Spinosa Dr., Sunnyvale, Calif. 94087

[73] Assignee: Tom T. Matsumoto, Sunnyvale, Calif.

[21] Appl. No.: 104,138

[22] Filed: Dec. 17, 1979

Related U.S. Application Data

[63] Continuation-in-part of Ser. No. 903,426, May 8, 1979, abandoned.

[51] Int. Cl.³ .......................... B65G 67/04; B65G 67/24

[52] U.S. Cl. .......................................... 414/400; 296/52; 414/786

[58] Field of Search .................. 414/400, 401; 296/50, 296/52, 146, 180, 181, 195; 298/17 R, 23 R, 23 MD, 23 M, 23 D, 23 S; 100/229 A

[56] References Cited

U.S. PATENT DOCUMENTS

| | | | |
|---|---|---|---|
| 2,148,798 | 2/1939 | Barrett | 298/23 MD X |
| 2,212,058 | 8/1940 | Wood | 298/23 MD X |
| 2,263,199 | 11/1941 | Wachter et al. | 298/23 M X |
| 3,059,789 | 10/1962 | Bowles | 414/400 X |
| 3,104,910 | 9/1963 | Kappen | 296/52 X |
| 3,131,962 | 5/1964 | St. Clair | 296/50 X |
| 3,336,080 | 8/1967 | Heck et al. | 298/17 R X |
| 3,395,937 | 8/1968 | Hoyerman | 298/17 R X |
| 3,447,700 | 6/1969 | Nickel | 298/23 MD X |
| 3,552,586 | 1/1971 | Edlund | 414/339 |
| 4,194,787 | 3/1980 | Williamsen | 298/23 M |

*Primary Examiner*—James L. Rowland
*Attorney, Agent, or Firm*—Thomas H. Olson

[57] ABSTRACT

A refuse compaction trailer of the type used with a stationary packer positioned adjacent to the rear of the trailer to compact refuse into the body of the trailer. The body of the trailer has a rear portion shaped to prevent spillage outside the trailer after removing the trailer from the stationary packer. The body of the trailer includes sloped side walls which define the opening for a stationary packer. A rear overhead door is adapted to slide up and down inside tracks in the sloped side walls. The shape of the rear of the trailer body permits the rear wheels of the trailer to be moved back under the packer extension to reduce loading on the rear wheels.

3 Claims, 5 Drawing Figures

REFUSE COMPACTION TRAILER

CROSS REFERENCE TO RELATED APPLICATION

This is a continuation in part of application Ser. No. 903,426, filed May 8, 1979, now abandoned.

BACKGROUND OF THE INVENTION

This invention relates in general to the transportation of solid waste material, and in particular to solid waste transportation vehicles. In transporting refuse from a collection station to a disposal area it is conventional to use refuse compaction trailers which are loaded by a stationary packer which hydraulically forces refuse into the body of the trailer. Collected refuse is usually brought to centrally located transfer stations which are equipped to receive the refuse and, through the utilization of stationary packers, to compress the refuse into large trailers to be hauled to refuse burning plants or landfill area.

Refuse deposited at the transfer station is dumped through the top opening of a stationary packer and compacted by a packer head into the body of a trailer. When the trailer is full, it is hauled to a disposal area. This type of trailer and stationary packer arrangement has the disadvantage of creating spillage of refuse outside of the body of the trailer as the tractor is moved away from the stationary packer. The packer head extends a short distance into the body to produce packing; however, the elasticity of the packed refuse forces the refuse rearwardly when the head is withdrawn, thus creating spillage through the rear opening as the trailer is separated from the packer.

In addition, in compaction trailers, it is desirable to reduce the loads acting on the rear wheels and to distribute more of the loads to the tractor wheels. State regulations usually limit the maximum weight carried by each axle; thus to the extent that weight can be shifted from the rear axles to the tractor axles, the total load carried by the vehicle can usually be increased.

SUMMARY OF THE INVENTION

In view of the foregoing, it is an object of this invention to eliminate spillage of refuse from compaction trailers when the trailers are separated from stationary packers.

Another object of this invention is to improve the construction of refuse trailers by providing for the effective weight distribution to all of the wheels of the vehicle.

Broadly, the invention embraces a refuse compaction trailer comprising a body having surrounding walls, a top, a floor, and a portion at the rear of the body, having sloped side walls so that the trailer floor can be moved beneath the discharge of a packer without the top of the trailer obstructing the loading hopper of the packer. Thus, a stationary packer used in conjunction with the trailer can extend into the trailer over the floor at the rear of the body between the sloped walls. Expansion of the compacted refuse when the trailer is withdrawn from the packer is taken up by the space in the trailer enclosed by the sloped walls and the floor at the rear. Thus, the center of gravity of the load is moved forward of the rear axles to effect more nearly uniform weight distribution between front and rear axles.

BRIEF DESCRIPTION OF THE DRAWINGS

The invention may best be understood by reference to the following description taken in connection with the accompanying drawings in which.

DESCRIPTION OF THE PREFERRED EMBODIMENT

Figure 1:
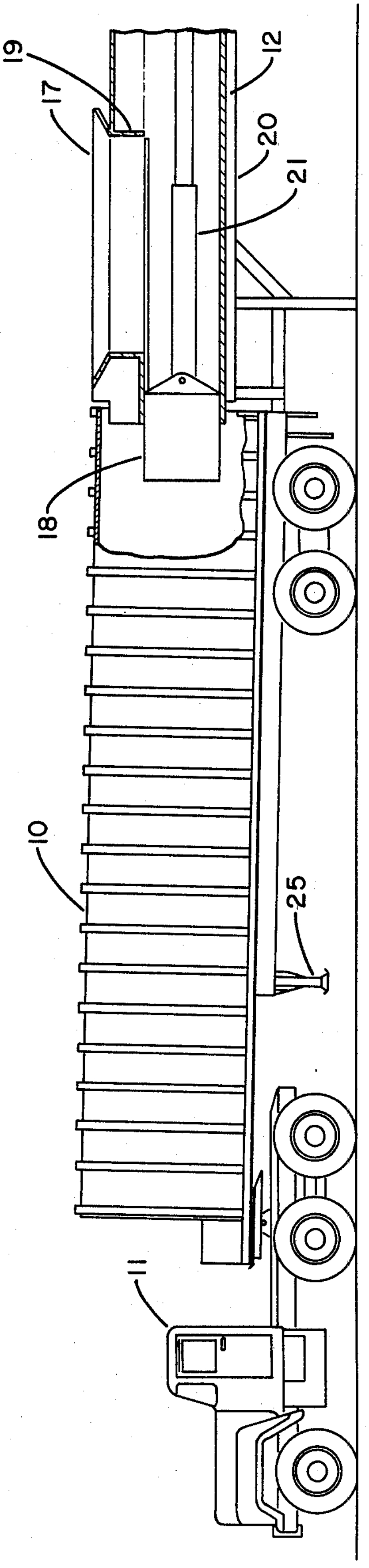
PRIOR ART FIG. 1
FIG. 1 is a side view, with portions broken away, of a conventional refuse compaction trailer coupled to a stationary packer.

Referring to the drawings, FIG. 1 shows a conventional tractor trailer where the trailer is a compaction trailer adapted to function with a stationary packer to load refuse into the body of the trailer. The compaction trailer 10 is suitably coupled to a detachable tractor 11 so the trailer can be hauled over the road to a disposal site or backed up to a stationary packer 12 for loading. It can be seen from FIG. 1 that the packer 12 abuts the end of the trailer 10 and is suitably coupled to the trailer by hooks or other means, not shown. Refuse is loaded into the hopper 17 at the top of the packer and is formed into the trailer by a packing head 18. When the trailer is moved away from the tractor, the refuse tends to spring back, out of the rear opening of the trailer spilling on the ground.

Figure 2:
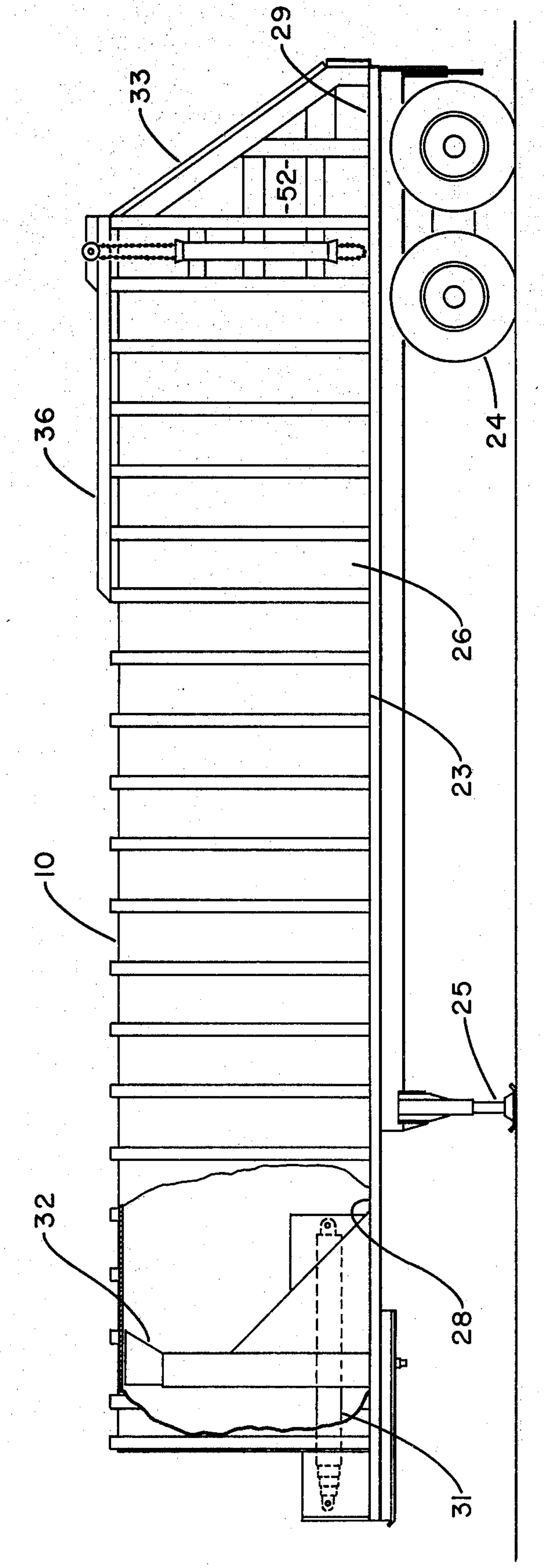
FIG. 2 is a side view, with portions broken away, of a refuse compaction trailer embodying the present invention.
Figure 3:
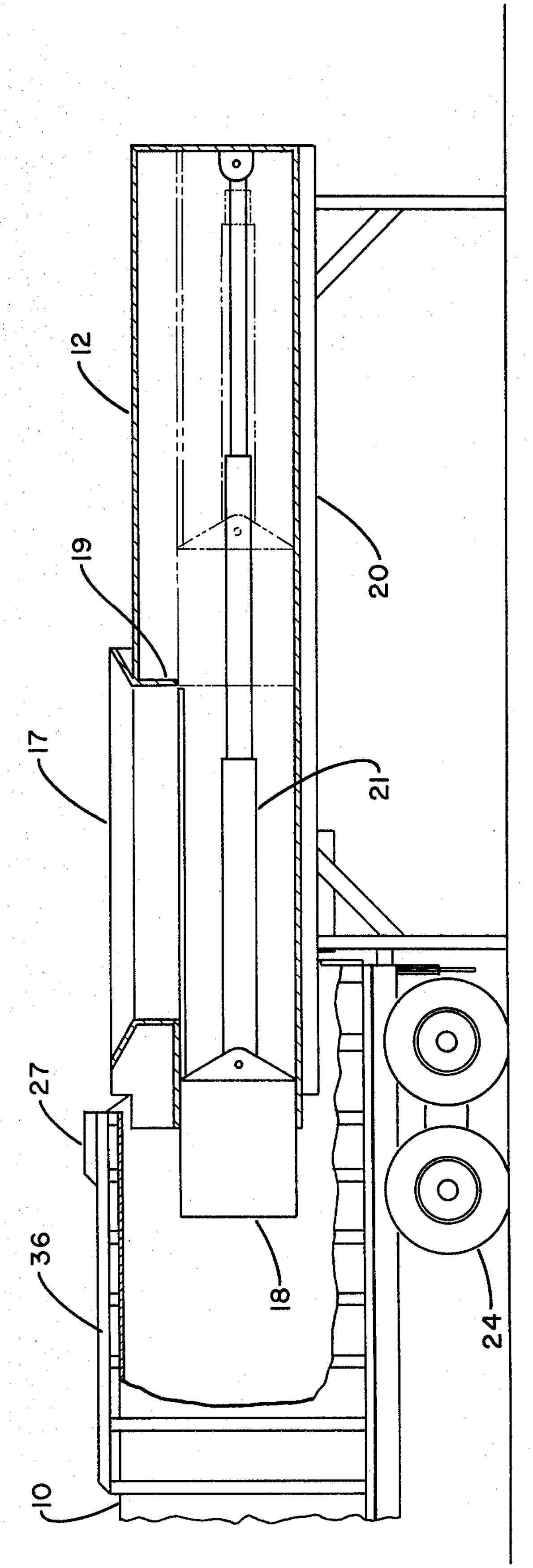
FIG. 3 is a side view, with portions broken away, of a compaction trailer coupled to a stationary packer.

The refuse compaction trailer of the present invention as seen in FIG. 2 is adapted to be used with a stationary packer 12 in the manner shown in FIG. 3. The packer includes a charging box 19 and frame 20 which contains a packer head 18 operated by a double-acting hydraulic cylinder 21. An hydraulic power unit (not shown) may be located beneath the packer 12, or at any convenient location. The charging box of the stationary packer includes a loading hopper 17 into which a material is dumped, for example, from a chute of a transfer station. A typical installation of packer 12 includes a floor surface that is flush with the upper edge of loading hopper 17. Refuse is deposited on such floor surface and moved by means of a bulldozer or the like into hopper 17.

The refuse compaction trailer in FIG. 2 includes an elongate body 23 supported at its rear end on ground engaging rear wheels 24 and at its front on a landing gear 25. The body of the trailer 23 includes a pair of side walls 26 upstanding from a floor 28. A rear portion 29 of the floor 28 projects rearwardly beyond the rear extremity of the top wall of the trailer. The side walls 26 of the body extend rearwardly and form sloped side walls 52 which enclose the rear portion 29 of the floor of the trailer. The sloped walls 52 define an opening in the rear of the trailer, through which the refuse is loaded into the body 23. Refuse is ejected from the trailer by a hydraulic cylinder 31 and movable ejection plate 32 at the front of the trailer.

In the refuse transport vehicle shown in the drawings, rear wheels 24 are supported on dual axles; the support point at which the load at the rear of the vehicle is supported is vertically above a site midway between dual axis. In lighter duty vehicles having only a single rear axle, the load support point at the rear of the vehicle is vertically above the single axle. As can be seen in FIG. 3, the outer limit of travel of packing head 18 is forward of the support point provided by the rear axle and wheels.

The rear wheels 24 are located under floor portion 29 to reduce load distribution on the rear wheels. The packer 12 extends over the rear portion 29, as seen in FIG. 3, to the same relative position as the packer used with a conventional trailer, as shown in FIG. 1. Thus, the load of refuse packed into the trailer is essentially the same in both cases and the center of gravity of the refuse remains in the same location. However, since the rear axles are located under rear floor portion 29 in the present invention, the distance between the center of gravity of the refuse and the support point provided by the rear axles is greater in the present invention than in conventional trailers. This greater distance between the center of gravity and the rear axles causes more of the weight of the refuse to be supported by the tractor wheels and less by the rear wheels of the trailer. Moreover, because of the presence of the sloped rear edges of sloped walls 52 and the consequent foreshortening of the top wall of the trailer, the opening formed by loading hopper 17 is not obstructed when refuse trailer 10 is in the position shown in FIG. 3.

Uniformity of load distribution is particularly desirable where regulations limit the allowable load per axle on trailers. Normally, these are regulations which limit both the total load that can be carried by a vehicle and the load on each axle. The load on the rear axle is usually exceeded before the total allowable load is met. By reducing the load on the rear axle, more refuse can be packed into the trailer before the regulated limits are exceeded.

Figure 4:
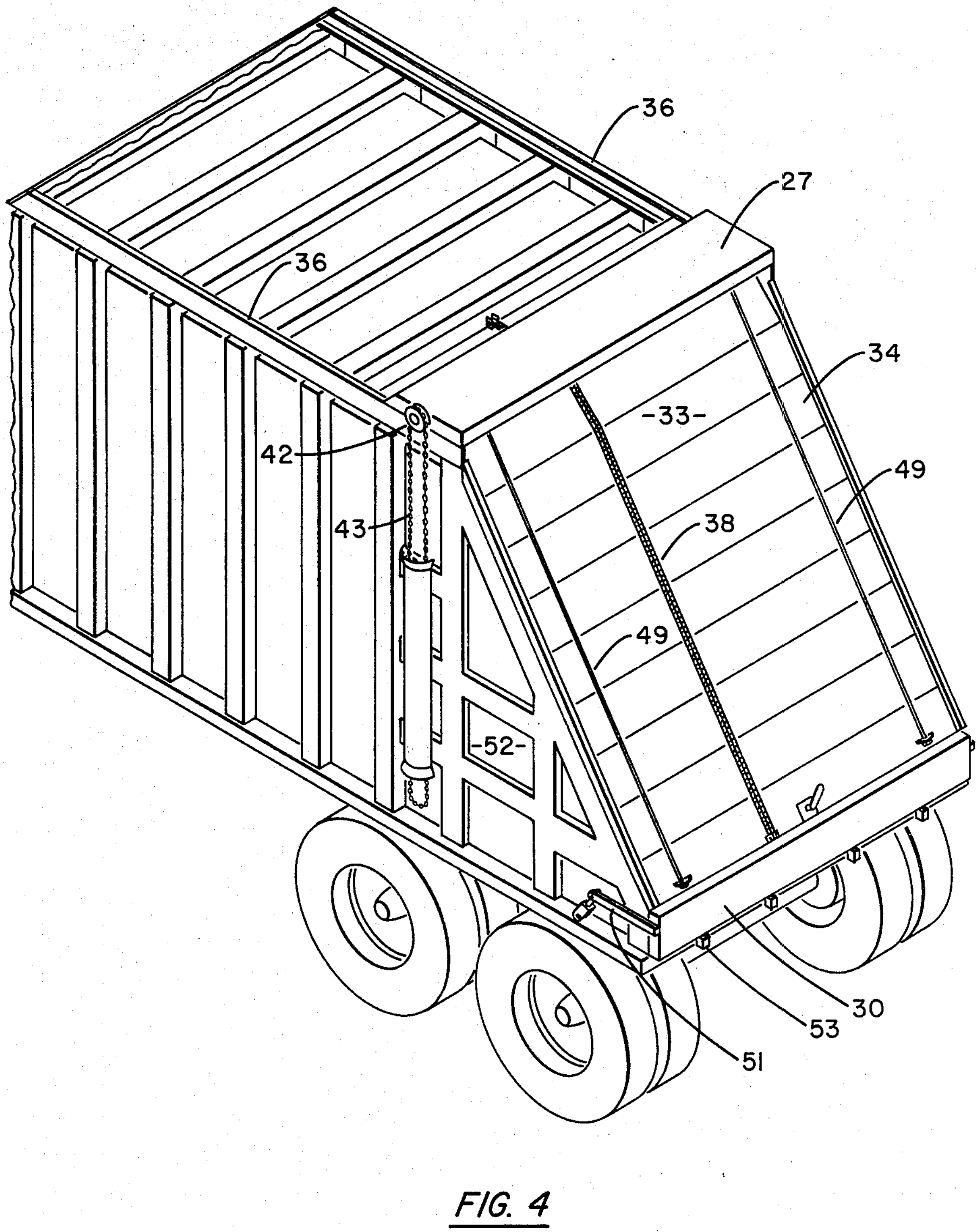
FIG. 4 is a rear isometric view of a portion of a refuse compaction trailer embodying the present invention.
Figure 5:
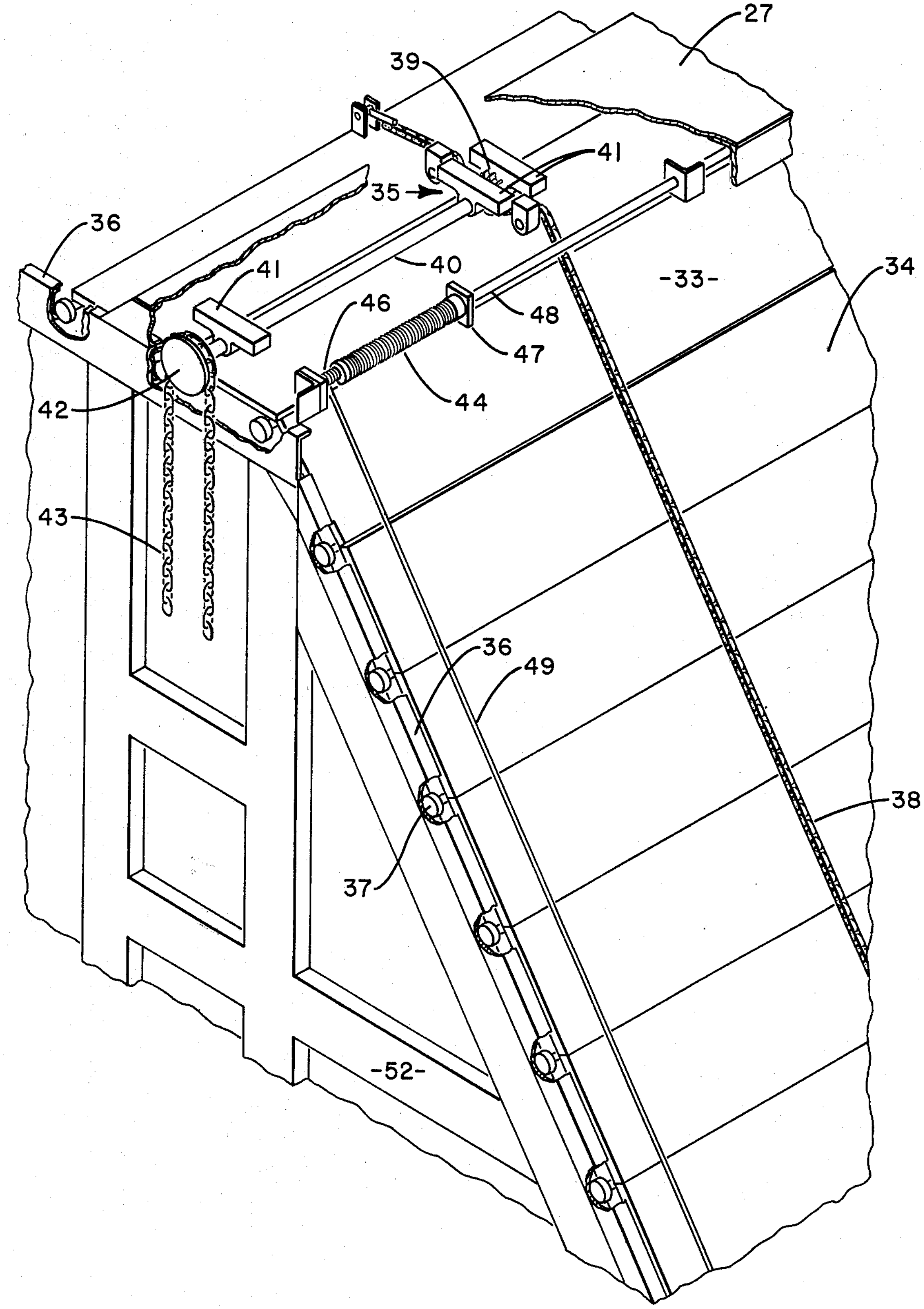
FIG. 5 is a rear isometric view of a portion of a refuse compaction trailer embodying the present invention with portions broken away to show the operation of the tailgate mechanism.

The rear opening in the body of the trailer defined by the floor rear portion 29, vertical lower door 30, the sloped side walls 52 and the top of the trailer is closed, as seen in FIGS. 4 and 5, by the overhead door 33. The lower door 30 is hinged on one of the side walls 26 and locked by a side latch 51 and four wedge latches 53. The vertical lower door 30 prevents feed back and spillage of material underneath the packer frame 20 when the packer 12 is against the trailer 10. The door 30 is fitted with a rubber gasket (not shown) to seal the interior of the trailer and prevent seepage of liquids out of the trailer. The door 30 may be side hinged to swing open or bottom hinged for vertical opening. When closed, the door 30 prevents spillage of refuse from the trailer 10 as the trailer is separated from the packer. The door 30 is opened when the refuse is to be expelled or unloaded from the trailer. Door 33 includes a series of articulated panels 34, a roller chain 38 and rollers 37 adapted to slide in guide tracks 36. Guide tracks 36 are mounted on the sloped side walls 52 and extend over the upper portions of side walls 26 of the body 23.

A mechanism 35 for closing and opening the overhead door is located at the top of the trailer under a cover panel 27. The mechanism 35 as seen in FIG. 5, includes a shaft 40 arranged in bearings 41 attached to the cover panel 27. A roller sprocket 39 is mounted on the shaft 40 and carries the roller chain 38. A second sprocket 42 mounted on the end of the shaft 40 carries a loop of hand chain 43. The mechanism 35 for opening and and closing the overhead door further includes two torsion springs 44 mounted on a shaft 48 and connected to a drum 46 at one end and to a support 47 at the opposite end. One torsion spring 44 can be seen in FIG. 5; however, a second such spring is mounted on shaft 48 at the opposite end thereof. The torsion springs 44 are set up in the mechanism 35 to facilitate the upward movement of the overhead door.

The supports 47 are fixed to the shaft 48 and prevent rotation of the ends of the torsion springs 44. The drums 46 freely rotate about shaft 48 and rotate the opposite ends of the springs 44. One drum 46 is shown in FIG. 5 in relation to one of the springs 44, however, a second drum, not shown, is mounted in the same manner at the opposite end of shaft 48 for use in conjunction with the second spring 44, also not shown. A pair of cables 49 is attached at one end to the drums 46 and at their other ends to the bottom of the door 33. With the door 33 in the closed position, the cables 49 are extended and the springs 44 and 45 are in the coiled or tensioned position. As the door is raised, the springs 44 tend to uncoil and wind the cables 49 on the drums 46. The uncoiling of the springs 44 takes up some of the weight of the door 33, thus aiding in raising the door. When the door is lowered to the closed position, the cables 49 extend rotating the drums 46 and winding or coiling the springs 44.

To open the overhead door 33 an operator rotates the hand chain 43 which rotates the sprocket 42, the shaft 40 and the roller sprocket 39. The sprocket 39 engages the roller chain 38 pulling the chain and the overhead door 33 upwards. The rollers 37 slide in the guide tracks 36 along the edges of the sloped walls 26 over the top of the trailer. To close the door 33 the chain 38 is rotated in the opposite direction. The roller sprocket 39 engages the chain 38 which pulls the top of the door 33 downward closing the door.

In the use of the refuse compaction trailer of the invention, the charging box 19 of the stationary packer is loaded with refuse. The packing head 18 moves refuse from the charging box 19 into the attached compaction trailer 10 through the opening in the rear of the trailer by the force of hydraulic cylinder 21. The packer head 18 travels inside the compaction trailer 10 to achieve maximum loads and force the refuse forward of rear floor portion 29. As the trailer fills, pressure on the confined material increases causing it to be compacted into a mass of reduced volume. When the loading is completed, the trailer is moved away from the packer 12. The refuse in the trailer expands due to its own resiliency. As the refuse expands, it falls into the area between the sloped walls 52 rather than falling on the ground as spillage. The door 33 is then closed.

The sloped edges at the rear of the side walls permit the rear floor portion 29 to be positioned farther rearward of the stationary packer (i.e., rightward as viewed in FIG. 3) without obstructing loading hopper 17. Accordingly, without modifying the stationary packer, refuse can be moved to a position nearer the center of the trailer than is possible in the prior art trailer shown in FIG. 1.

The invention has been described in detail with particular reference to a preferred embodiment; however, it should be understood that variations and modifications can be effected within the spirit and scope of the invention.

What is claimed is:

1. A refuse transport vehicle capable of use with a stationary refuse compactor of the type that has a refuse chamber supported above a horizontal surface, a loading hopper above the chamber and communicating therewith for affording introduction of refuse into the chamber, said chamber having a horizontal extension terminating in a discharge opening, and a packing head for reciprocal movement within the chamber to move refuse horizontally therein through the discharge opening, said vehicle comprising a floor, first and second side walls and a top wall forming a closed body having a rearward opening of general rectangular cross-sectional shape and sized to receive said chamber extension therein, said floor and said top wall having rear extremities, the rear extremity of the floor being rearward of the rear extremity of the top wall by a given distance and said side walls having sloped edge portions extending between the rear portions of said floor and top wall so that said vehicle can be moved on said horizontal surface beneath said discharge opening with the vehicle body surrounding said extension, with the rear extremity of the floor rearward of the discharge opening and with the rear extremity of said top wall free of said loading hopper, first and second guide tracks having portions mounted to the sloped edge portions of respective said side walls in confronting relation across said rearward opening, a door spanning the space between said tracks and slidably supported therein for closing said rearward opening, said guide tracks having portions remote from said rearward opening and attached to the exterior of said body for affording movement of said door clear of said rearward opening and in non-obstructing relation to said loading hopper.

2. A refuse vehicle according to claim 1 including at least one transversely extending axle fixed to the bottom surface of said floor at a support point, and at least two ground engaging wheels mounted on said axle, said support point being located intermediate the rear extremity of said floor and the rear extremity of said top wall so that said vehicle is capable of being positioned in loading relation to said stationary refuse compactor with the support point rearward of the discharge opening in order that the packing head of the refuse compactor can move refuse forward of said support point.

3. A refuse compaction trailer of the type having a body to retain packed refuse including a top, side walls and floor and used with a stationary packer which packs refuse into the body of the trailer comprising an extension on the rear of the body including a floor extending rearwardly of the body floor and sloped side walls extending rearwardly from the body side walls and sloping downwardly from the top of the body side walls, said extension being sized to receive the stationary packer between the sloped side walls and over the extension floor, and a door enclosing the opening between the sloped side walls, said door being an overhead door comprising a series of articulated panels mounted for movement in side tracks on the sloped side walls and top of the trailer, and including a vertical door extending between the bottom of the overhead door and the floor of the extension to prevent spillage of refuse beneath the vertical packer, and means to open and close the overhead door including a roller chain linked to the top and bottom of the overhead door, a first sprocket engaging said roller chain and secured on a shaft on the top of the trailer, a second sprocket fixed to the end of said shaft, and a closed loop hand chain arranged to engage the second sprocket to rotate the second sprocket, the shaft and the first sprocket to thereby move the roller chain to open or close the overhead door.

* * * * *